Nov. 19, 1957 C. E. RENN 2,813,768
INCUBATOR CABINET
Filed June 7, 1954 2 Sheets-Sheet 1
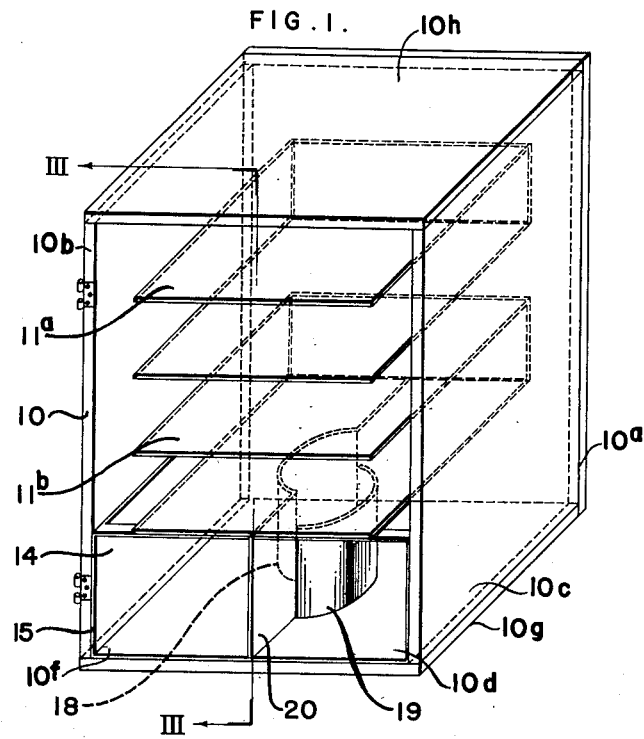
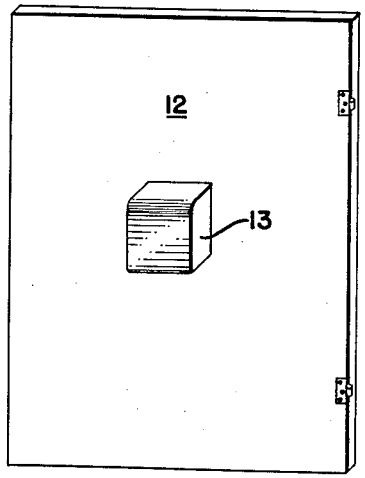
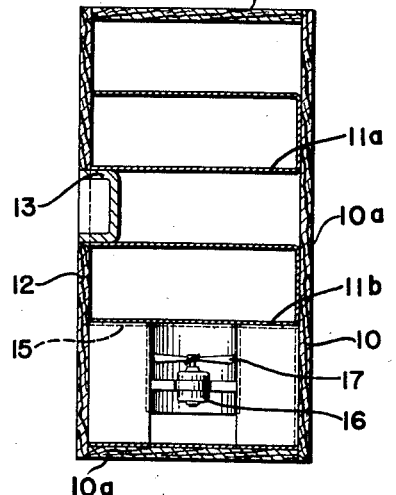
INVENTOR.
CHARLES E. RENN Nov. 19, 1957 C. E. RENN 2,813,768
INCUBATOR CABINET
Filed June 7, 1954 2 Sheets-Sheet 2

INVENTOR.
CHARLES E. RENN
BY Hoopes Leonard & Buell
his attorneys

United States Patent Office 2,813,768
Patented Nov. 19, 1957

2,813,768

INCUBATOR CABINET

Charles E. Renn, Baltimore, Md., assignor to Salem-Brosius, Inc., Pittsburgh, Pa., a corporation of Pennsylvania Application June 7, 1954, Serial No. 434,739

6 Claims. (Cl. 312—236)

This invention relates to incubators and particularly to portable incubators for bacteriological preparations and the like.

A large amount of bacteriological field work requires the use of an incubator for promoting the growth of bacteria preparations for study. There has heretofore been no simple, adequate portable incubator for such work. Various types of apparatus have been used mainly based upon the use of cumbersome water jackets to maintain the temperature of the incubator at the desired point.

I provide a simple, portable incubator which is light in weight, very convenient to handle and to operate and eliminates all of the difficulties heretofore present in field incubation of bacteriological preparations.

I provide a portable incubator having a housing with side walls and end walls, one of which side walls is hinged to form an access door. Spaced shelves of magnetic material are fixed to the interior of the housing so as to permit circulation of air between the shelves and across each shelf. Means are provided in the housing for heating and circulating the air therein and control means are provided controlling the heating and circulating means to maintain a substantially constant temperature within the housing.

Preferably the walls of the housing are made of insulating material and the shelves are U-shaped sheets of magnetic material fastened to the side wall opposite the access door and spaced from the adjacent side walls to permit air flow along the edges of the shelves. The shelves may be solid, perforated or built up out of spaced rods as desired. The shelves are made of magnetic material and the bacteriological preparations are placed in metal ointment jars which are retained on the shelves even though the incubator is tilted or jolted in the field. Preferably the access door is fitted with a handle of permanently magnetized material extending inwardly into contact with adjacent pairs of shelves. The heating and circulating means is preferably an electric motor and fan thereon surrounded by a baffle directing air from one side of the housing around the motor to heat the air from the winding coils of the motor and discharge the heated air upwardly along a side wall. Preferably the heating and circulating means is made in a removable unit whereby a 6 volt D. C. motor unit can be used in a motor vehicle and a 110 volt motor unit substituted where commercial power is available.

While certain salient features, objects and advantages of my invention have been discussed generally above, other advantages, features and objects will become apparent from a consideration of the following description and the accompanying drawings in which:

Figure 1 is an isometric view partly in elevation of a portable incubator according to my invention with the access door removed;

Figure 2 is an isometric view of a door for use on the incubator of Figure 1;

Figure 3 is a section on the line III—III of an incubator such as that of Figure 1;

Figure 4:
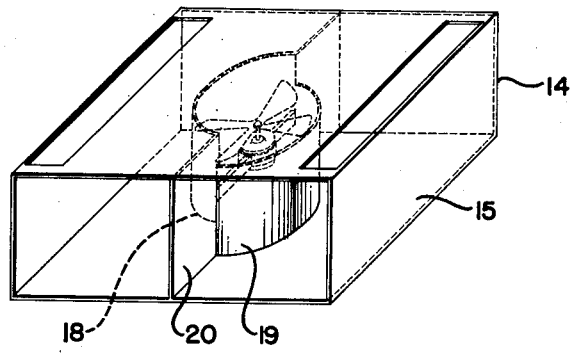
Figure 4 is an isometric view of a heating and circulating unit for use in the incubator of Figure 1.
Figure 5:
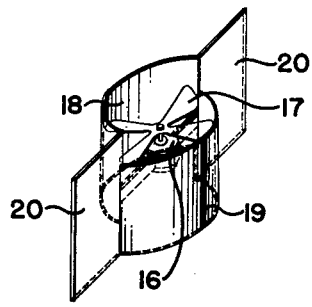
Figure 5 is an isometric view of the motor, fan and baffle arrangement of the heating and circulating unit of Figure 4.

Referring to the drawings I have illustrated a housing 10 made of insulating material having a rear wall 10a, sidewalls 10b and 10c, an open front 10d and end walls 10g and 10h. A pair of U-shaped shelves 11a and 11b of permanently magnetized material are fixed by means of screws or bolts, not shown, to the rear wall 10a of the housing 10 and are spaced from the adjacent side walls 10b and 10c to form a passage for air on each side. A door 12 is hinged on the front 10d of the housing. A handle 13 of permanently magnetized material is fitted in the door to contact one shelf of each pair of shelves so as to make a continuous circuit through the shelves. This magnet acts as a latch for the door as well as a bridge between the shelves, augmenting the fields of the various shelf sections.

A removable heating and circulating unit 14 is placed in the bottom of the housing 10. The unit has an outer framework 15 slidable into the base 10e of the housing 10 in guideways 10f formed by the corners of the housing and carrying an electric motor 16 and fan blade 17. The motor is surrounded by a pair of semicylindrical baffles 18 and 19 which direct the air from one side of the shelves, through the motor to heat it and discharge it along the opposite side of the shelves. A vertical baffle 20 on each edge of the semicylindrical baffles prevents air from by-passing the motor and fan.

A thermostat may be placed within the incubator to control the operation of the heating and circulating unit. Such thermostat circuits are conventional and accordingly no illustration is deemed necessary.

The magnetized shelves furnish a small but desirable force to hold sheet steel enclosures such as small ointment boxes, commonly used as expendible miniature Petri dishes for the milipore bacteriological techniques commonly used. In relatively large chambers, where such small sheet steel boxes may be piled in columns, the magnetic field also maintains the column against displacement or upsetting under slight vibration and shock. The possibilities of accidentally destroying the contained bacteriological preparations are greatly reduced by anchoring the container magnetically. Preferably the U-shaped shelf sections are aligned so that the poles of adjacent shelves are opposite in magnetic character.

While I have illustrated and described a presently preferred embodiment of my invention it will be understood that it may be otherwise embodied within the scope of the following claims.

I claim:

1. A portable incubator for bacteriological preparations and the like comprising a housing having side walls and end walls, one of said side walls being hinged to form an access door, spaced shelves of magnetic material fixed to the interior of said housing to permit circulation of air between the shelves and across each shelf, a permanent magnet on the access door adapted to engage between two spaced shelves insulated electrically from one another and means adjacent one end wall of the housing adapted to receive interchangeable heating and air circulating units.

2. A portable incubator as claimed in claim 1 wherein the shelves are U-shaped sheets of magnetic material fixed to the side wall opposite the access door and spaced from the other adjoining side walls to permit air flow vertically along the edges thereof.

3. A portable incubator for bacteriological preparations and the like comprising a housing having side walls and end walls one end wall forming a base, one of said side walls being hinged to form an access door, spaced shelves of magnetic material fixed to the interior of said housing to permit circulation of air between the shelves and across each shelf, a permanent magnet on the access door adapted to engage between two spaced shelves insulated electrically from one another, guideways in the base of the housing beneath the shelves and interchangeable heating and air circulating units slidable in said guideways.

4. A portable incubator as claimed in claim 3 wherein the side walls are made of insulating material.

5. A portable incubator for bacteriological preparations and the like comprising a housing having side walls and end walls, one end wall forming a base one of said side walls being hinged to form an access door, spaced shelves of magnetic material, said shelves being formed in pairs from U-shaped sheets fixed to the side wall opposite the access door and spaced from the adjacent side walls to permit air flow vertically along the edges thereof, a permanent magnet on the access door adapted to pass between one shelf of two spaced pairs whereby to form a continuous circuit between the pairs, guideways in the base of the housing beneath the shelves and interchangeable heating and air circulating units slidable in said guideways.

6. A portable incubator as claimed in claim 5 wherein the U-shaped shelf sections are aligned so that the poles of adjacent shelves are opposite in magnetic character.

References Cited in the file of this patent

UNITED STATES PATENTS

| | | |
|---|---|---|
| 1,943,575 | Abendroth | Jan. 16, 1934 |
| 2,296,930 | Ihler | Sept. 29, 1942 |

FOREIGN PATENTS

| | | |
|---|---|---|
| 569,433 | Germany | Feb. 3, 1933 |
| 667,440 | Great Britain | Feb. 27, 1952 |
| 672,928 | Great Britain | May 28, 1952 |
| 1,037,129 | France | Apr. 29, 1953 |